United States Patent
Hara et al.

(10) Patent No.: US 6,254,204 B1
(45) Date of Patent: Jul. 3, 2001

(54) DEVICE FOR MEASURING LONGITUDINAL ACCELERATION OF VEHICLE IMMUNE TO STATIC AND DYNAMIC ERRORS

(75) Inventors: Kouichi Hara, Susono; Kazunori Kagawa, Toyota; Akiharu Kanagawa, Nogoya, all of (JP)

(73) Assignees: Toyota Jidosha Kabushiki Kaisha, Toyota; Aisin Seiki Kabushiki Kaisha, Kariya, both of (JP)

( * ) Notice: Subject to any disclaimer, the term of this patent is extended or adjusted under 35 U.S.C. 154(b) by 0 days.

(21) Appl. No.: 09/353,763

(22) Filed: Jul. 15, 1999

(30) Foreign Application Priority Data

Aug. 7, 1998 (JP) .................................................. 10-224729

(51) Int. Cl.$^7$ ................................. B60T 8/38; B60T 8/58
(52) U.S. Cl. ..................................... 303/183; 364/426.024
(58) Field of Search .................................. 303/170, 172, 303/173, 183; 364/426.024

(56) References Cited

U.S. PATENT DOCUMENTS

| | | |
|---|---|---|
| 4,774,667 | 9/1988 | Kuraoka et al. . |
| 4,974,163 * | 11/1990 | Yasuno et al. .................. 364/426.02 |
| 5,019,985 * | 5/1991 | Yasuno et al. .................. 364/426.02 |
| 5,446,658 * | 8/1995 | Pastor et al. ..................... 364/424.01 |
| 5,488,562 * | 1/1996 | Otterbein et al. ............... 364/424.05 |
| 5,702,165 | 12/1997 | Koibuchi . |
| 5,704,695 | 1/1998 | Monzaki et al. . |
| 5,765,657 * | 6/1998 | Fukumura et al. ................... 180/197 |
| 5,839,798 | 11/1998 | Monzaki et al. . |
| 6,015,192 * | 1/2000 | Fukumura ............................ 303/140 |

FOREIGN PATENT DOCUMENTS

| | | |
|---|---|---|
| 6-1229 | 1/1994 | (JP) . |
| 9-11870 | 1/1997 | (JP) . |
| 9-295564 | 11/1997 | (JP) . |

* cited by examiner

*Primary Examiner*—Christopher P. Schwartz
(74) *Attorney, Agent, or Firm*—Oliff & Berridge, PLC

(57) ABSTRACT

A first signal is obtained by detecting speed of wheels of a vehicle to indicate the wheel speed. On the other hand, a second signal is obtained by detecting longitudinal acceleration to directly indicate longitudinal acceleration of the vehicle. A third signal indicating the change rate of the wheel speed is obtained by differentiating the first signal by time. The third signal is sensitive to a small convex or concave of the road surface but not sensitive to a longitudinal inclination of the road surface. The second signal is not sensitive to a small convex or concave of the road surface but is sensitive to a longitudinal inclination of the road surface. Then, a fourth signal is obtained from the second signal by filtering low frequency components off therefrom, while a fifth signal is obtained from the third signal by filtering high frequency components off therefrom. Then, a final longitudinal acceleration signal is obtained by composing the fourth and fifth signals together. It will be desirable that a cutoff frequency of the low pass filtering is lowered when a brake locking has occurred.

8 Claims, 4 Drawing Sheets

DEVICE FOR MEASURING LONGITUDINAL ACCELERATION OF VEHICLE IMMUNE TO STATIC AND DYNAMIC ERRORS

BACKGROUND OF THE INVENTION

1. Field of the Invention

The present invention relates to a device for measuring longitudinal acceleration of vehicles, and more particularly, to such a longitudinal acceleration measuring device that is immune to static and dynamic errors.

2. Description of the Prior Art

A device for measuring longitudinal acceleration of a vehicle is well known and widely used in the art of automobiles, particularly in the art of the modern vehicle stability control using the microcomputers. Examples of those vehicle stability controls are shown in U.S. Pat. No. 5,702,165, U.S. Pat. No. 5,704,695 and U.S. Pat. No. 5,839,798. Those vehicle stability controls employ microcomputers to make vehicle stability calculations during the driving of the vehicles based upon various input signals in which the longitudinal acceleration of the vehicle is included.

As a matter of principle, a sensor for measuring longitudinal acceleration of a vehicle is operable with a pendulum adapted to shift forward or rearward relative to a housing which suspends the pendulum to be so swingable in response to an inertial force applied thereto according to a deceleration or an acceleration of the vehicle. Although a longitudinal acceleration sensor is generally one of the most important parameter sensors in most of the vehicle stability controls, errors in the measuring operations of the longitudinal acceleration sensors were cared for in none of those prior art controls. Nevertheless, the sensors for measuring the longitudinal acceleration of vehicles are inherently bound with static and dynamic errors which should be called external errors, because they are not such errors that will occur in the measuring device itself but they occur in a phase of the pertinent physical phenomenon transmitting to the sensor as a longitudinal acceleration. The static error is due to a longitudinal inclination of the road surface on which the vehicle is driven, while the dynamic error is mostly due to a temporal longitudinal oscillation of the vehicle caused by a small convex or concave deformation of the road surface.

SUMMARY OF THE INVENTION

In view of the above-mentioned particular situations of the longitudinal acceleration measurement in vehicles, particularly automobiles, it is a primary object of the present invention to provide a device for measuring longitudinal acceleration of a vehicle improved to be immune to such static and dynamic errors as described above.

According to the present invention, the above-mentioned primary object is accomplished by a device for measuring longitudinal acceleration of a vehicle having wheels, comprising:

first means for detecting wheel speed of at least one of the wheels to generate a first signal indicating the wheel speed;

second means for detecting longitudinal acceleration of the vehicle to generate a second signal indicating the longitudinal acceleration;

third means for differentiating the first signal by time to generate a third signal indicating change rate of the wheel speed;

fourth means for filtering the second signal to remove low frequency components thereof therefrom to generate a fourth signal;

fifth means for filtering the third signal to remove high frequency components thereof therefrom to generate a fifth signal; and sixth means for composing the fourth and fifth signals together to generate a sixth signal indicating the longitudinal acceleration of the vehicle.

The first signal obtained by the first means for detecting the speed of at least one of the wheels of the vehicle to indicate the wheel speed is based upon the rotation speed of the wheel, and therefore, the first signal is sensitive to a small convex or concave deformation of the road surface but not sensitive to a longitudinal inclination of the road surface. Therefore, the third signal indicating the change rate of the wheel speed obtained by the third means for differentiating the first signal by time is sensitive to a small convex or concave deformation of the road surface but not sensitive to a longitudinal inclination of the road surface.

On the other hand, the second signal obtained by the second means for detecting longitudinal acceleration to directly indicate the longitudinal acceleration of the vehicle is not sensitive to a small convex or concave deformation of the road surface but is sensitive to a longitudinal inclination of the road surface.

Therefore, when the fourth signal is obtained from the second signal by the fourth means so that low frequency components are removed from the second signal, the fourth signal is immune to both of a small convex or concave deformation of the road surface and a longitudinal inclination of the road surface. Similarly, when the fifth signal is obtained from the third signal by the fifth means so that high frequency components are removed from the third signal, the fifth signal is immune to both of a small convex or concave deformation of the road surface and a longitudinal inclination of the road surface.

Thus, there are obtained two separate signals each indicating the longitudinal acceleration of the vehicle while being immune to such static and dynamic errors as described above. Therefore, by composing the fourth and fifth signals together, the device for measuring longitudinal acceleration of a vehicle can provide an appropriate magnitude of the longitudinal acceleration, with such a performance that it is immune to the static as well as dynamic errors.

In the above-mentioned device, the sixth means may compose the sixth signal by averaging the magnitudes of the fourth and fifth signals.

The device may further comprise seventh means for detecting a locking condition of at least one of the wheels due to a braking applied by the brake system of the vehicle, and the fifth means may lower a threshold frequency for the filtration above which they remove the high frequency components from the third signal to generate the fifth signal when the seventh means detect the locking condition of the wheel.

In such a modification, the seventh means may detect the locking condition of the one wheel by a slip ratio thereof being larger than a threshold value thereof predetermined therefor.

BRIEF DESCRIPTION OF THE DRAWING

In the accompanying drawings.

DESCRIPTION OF THE EMBODIMENT

In the following, the present invention will be described in more detail with respect to a preferred embodiment thereof by referring to the accompanying drawings.

Figure 1:
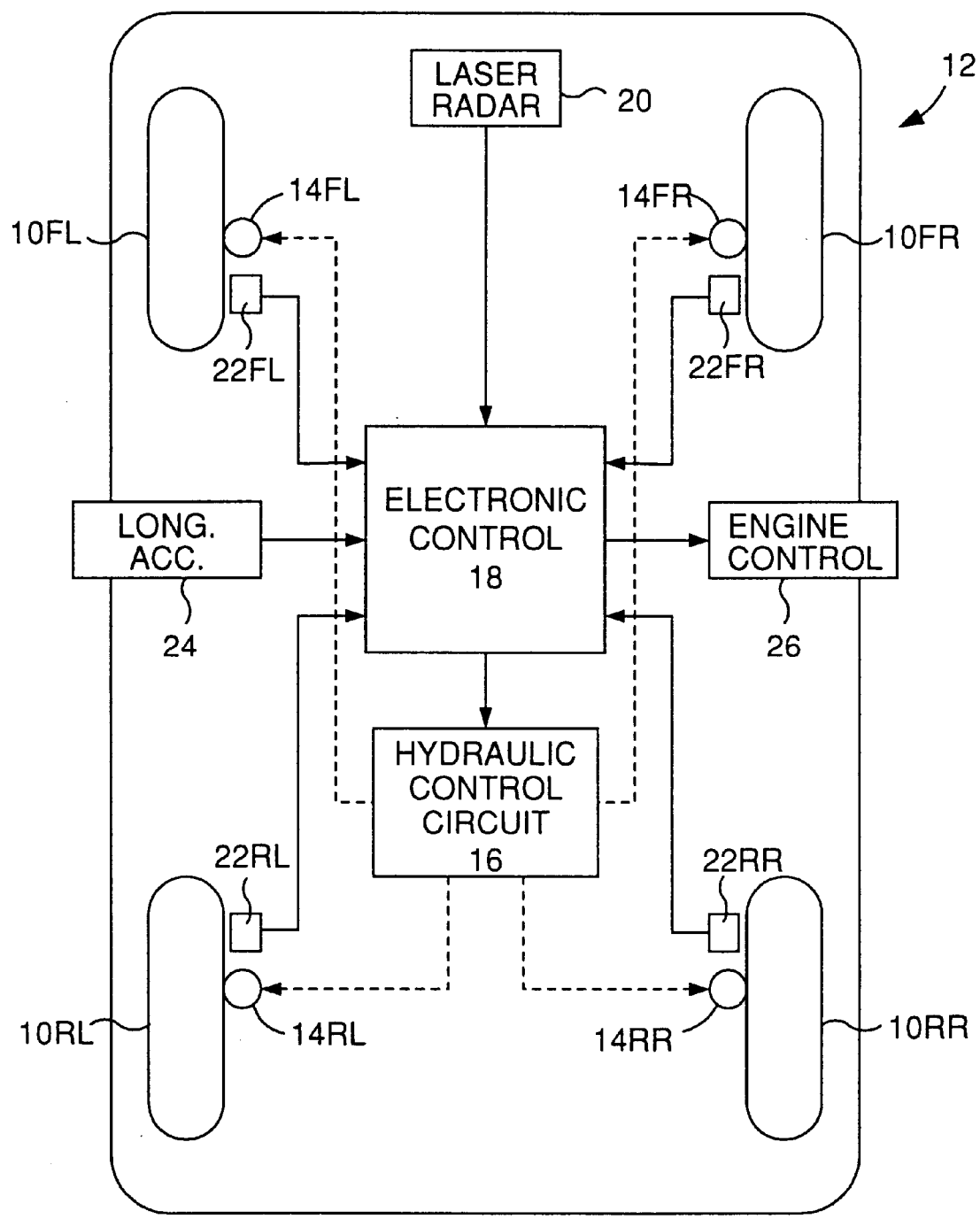
FIG. 1 is a diagrammatical plan view of a four-wheeled vehicle in which the device for measuring longitudinal acceleration of a vehicle according to the present invention is incorporated in the form of an embodiment.

Referring to FIG. 1, a four-wheeled vehicle generally designated by 12 has front left, front right, rear left and rear right wheels 10FL, 10FR, 10RL and 10RR, respectively. These wheels are each adapted to be applied with a braking by wheel cylinders 14FL, 14FR, 14RL and 14RR, respectively, by a hydraulic pressure being selectively supplied thereto from a hydraulic control circuit 16, which is operated under a control of electronic control means 18. The electronic control means 18 are supplied with a signal indicating a distance between the vehicle and an object existing ahead of the vehicle from a laser radar 20, signals each indicating wheel speed of each of the front left, front right, rear left and rear right wheels from wheel speed sensors 22FL, 22FR, 22RL and 22RR, respectively, and a signal indicating a longitudinal acceleration of the vehicle from a longitudinal acceleration sensor 24. The longitudinal acceleration sensor 24 may be of a conventional type. The electronic control means 18 conduct calculations for the present invention such as described hereinbelow, in addition to various control calculations such as those conducted by the vehicle stability controls of the above-mentioned U.S. patents, and control the hydraulic control circuit 16.

Further, the electronic control means 18 control an engine of the vehicle not shown in the figure via engine control means 26 such that the engine is automatically throttled when the laser radar 20 detects an obstacle such as a vehicle running ahead within a certain distance determined according to the vehicle speed, and further control the hydraulic control circuit 16 for automatically braking the vehicle when the laser radar 20 detects the obstacle to further approach. Although such an automatic cruise control is not directly related with the present invention, it is very important that the longitudinal acceleration of the vehicle is correctly detected for such a control.

As will be appreciated from the descriptions made hereinbelow, the device according to the present invention incorporated in the vehicle 12 of FIG. 1 to measure the longitudinal acceleration of the vehicle 12, is constructed by the electronic control means 18, the wheel speed sensors 22FL–22RR and the lateral acceleration sensor 24. The electronic control means 18 are substantially a combination of a hardware of a conventional microcomputer including a central processor unit, a read only memory, a random access memory, input and output port means and a common bus interconnecting these elements, and a software including a basic operation system, a calculation software for the present invention, and a certain automatic vehicle drive control system such as the above-mentioned automatic cruise control system.

Figure 2:
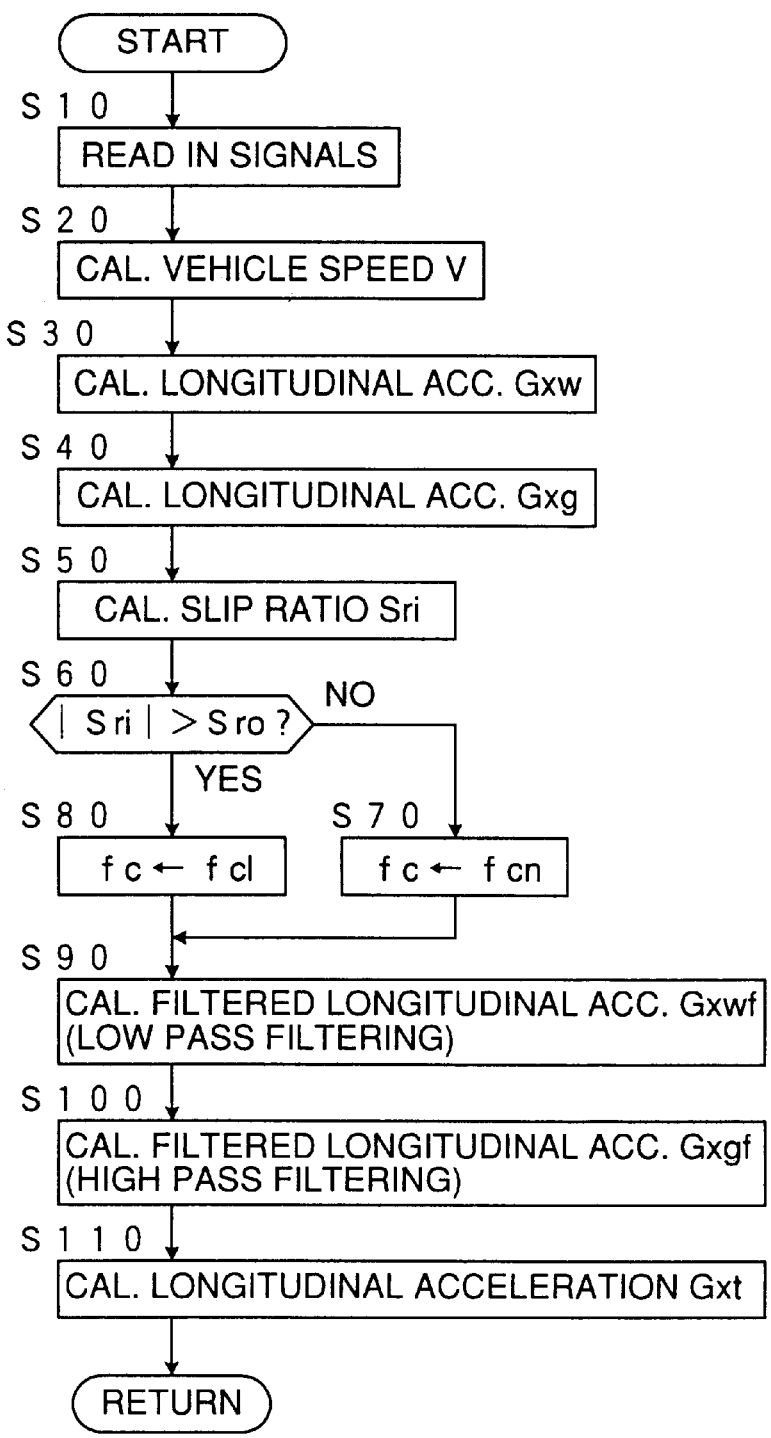
FIG. 2 is a flowchart showing the operation of the longitudinal acceleration measuring device of FIG. 1.

The construction, indeed a functional construction as usual in the inventions of this kind, of the device for measuring longitudinal acceleration of a vehicle according to the present invention will be described in the form of its operation by referring to the flowchart of FIG. 2. The operation of the longitudinal acceleration measuring device through steps of the flowchart of FIG. 2 is started upon a closure of an ignition switch (not shown) of the vehicle 12, and is repeated, returning from step 110 to step 10, at a cycle time such as tens of microseconds, until the ignition switch is opened.

When it has started, in step 10, the signals are read in from those sensors shown in FIG. 1.

In step 20, vehicle speed V is calculated based upon the signals received from the wheel speed sensors 22FL, 22FR, 22RL and 22RR. Only as a desirable embodiment, excluding the highest and the lowest of wheel speeds Vwi (i=fl, fr, rl, rr, denoting pertinency to front left, front right, rear left and rear right wheels, respectively), a mean value of the two remaining medium wheel speeds may be adopted to calculate the vehicle speed V.

In step 30, a time based differential of the vehicle speed V is calculated to obtain a change rate of the vehicle speed by time, i.e. a first longitudinal acceleration Gxw based upon the wheel speed. Indeed, Gxw may be calculated by dividing a difference between the magnitude of V in the current cycle of the control scanning through the flowchart of FIG. 2 and that in the previous cycle by the cycle time.

In step 40, based upon the signal received from the longitudinal acceleration sensor 24, a second longitudinal acceleration Gxg is calculated.

In step 50, based upon the signals received from the wheel speed sensors 22FL, 22FR, 22RL and 22RR, slip ratios Sri (i=fl, fr, rl, rr) of the corresponding wheels are calculated as follows:

$$Sri=(V-Vwi)/V \times 100$$

In step 60, it is judged if the absolute value of any of the slip ratios Sri is larger than a threshold value Sro determined therefor. The magnitude of Sro is so determined as to judge if any wheel is in a substantially slipping condition. When the answer is no, the control proceeds to step 70, while when the answer is yes, the control proceeds to step 80.

In step 70, a cutoff frequency fc for the below-mentioned low pass filtering process is set at a normal value fcn, while in step 80, the cutoff frequency fc is set at fcl which is lower than the normal cutoff frequency fcn. When one of the wheels shows a slip ratio larger than a limit such as the threshold value Sro, it indicates that the brake of the wheel is locking. When the brake is locking, the noises in the rotation speed signal broaden toward a lower frequency region. Therefore, it is desirable that the cutoff frequency fc is lowered than usual.

In step 90, the signal bearing the longitudinal acceleration Gxw based upon the wheel speeds is processed by a filtering process of removing such dynamic or oscillatory components therefrom that have frequencies higher than the cutoff frequency fc, so as to produce a corresponding signal of the longitudinal acceleration Gxwf. Since this process is a low pass filtering process, Gxwf is a low pass filtered longitudinal acceleration obtained based upon the wheels speeds.

By such an arrangement, it is expected that Gxwf is free of a noise due to a small convex or concave deformation of the road surface or a locking of the brake, when occurred. A relation between the low pass filtering of Gxw and the locking of the brake will be described later in more detail.

In step 100, the signal bearing the longitudinal acceleration Gxg is processed by a filtering process of removing such static or non-oscillatory components therefrom that are lower than an appropriate cutoff frequency in its frequency of changing, so as to produce a corresponding signal of longitudinal acceleration Gxgf. Since this process is a high pass filtering process, Gxgf is a high pass filtered longitudinal acceleration based upon the operation of the longitudinal acceleration sensor 24. This is to remove errors due to longitudinal inclinations of the road surface.

In step 110, the signals of Gxwf and Gxgf are combined to generate a final longitudinal acceleration signal of Gxt for use with the automatic behavior and/or cruise control of the vehicle. As a most simple embodiment, Gxt may be a mean of Gxwf and Gxgf.

Figure 3:
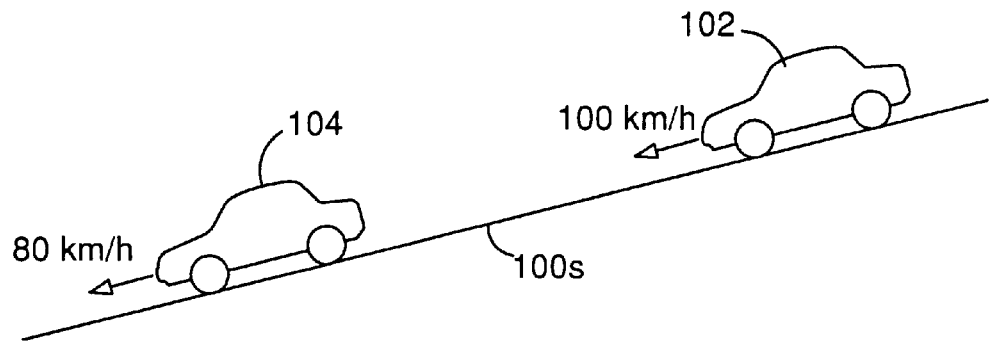
FIG. 3 is a diagrammatical illustration showing two vehicles driven on a downslope, causing a static error in the measurement of the longitudinal acceleration by a conventional longitudinal acceleration sensor.

It is assumed that, for example, two vehicles 102 and 104 are being driven along a downslope road 100s as shown in FIG. 3 at vehicle speeds 100 km/h and 80 km/h, respectively, the vehicle 102 being equipped with an automatic cruise control device incorporated in the electronic control means 18 thereof so as to operate with the laser radar 20, while using the longitudinal acceleration of the vehicle as an input parameter for the control. When the downslope is 20%, a conventional longitudinal acceleration sensor such as the sensor 24 of FIG. 1 will show a constant error of 0.2 g ("g" is the acceleration of gravity.) in its output on such a downslope. The error of 0.2 g is 1.96 m/sec$^2$. The difference of 20 km/h in the vehicle speed will cancel an inter-vehicle distance such as e.g. 20 m in 3.6 sec unless controlled. Therefore, a deceleration by a braking of the order of 10 m/sec$^2$ will be required for the automatic cruise control of the vehicle 102 to execute. In such a case, the error of 1.96 m/sec$^2$ will cause nearly 20% error in the control operation of the device. Such an error is, however, avoided by the present invention.

Figure 4:
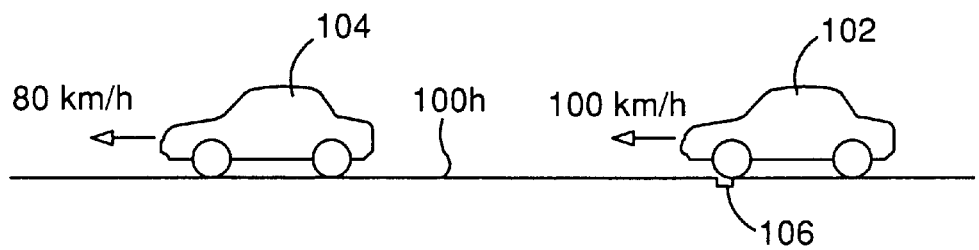
FIG. 4 is a diagrammatical illustration showing two vehicles driven on a horizontal road having a concave deformation in the road surface, causing a dynamic error in the measurement of the longitudinal acceleration by a conventional longitudinal acceleration sensor.

When the two vehicles are being driven on a horizontal road 100h which, however, has a small concave 106 as shown in FIG. 4, there will occur no such constant error in the output of a conventional longitudinal acceleration sensor such as the sensor 24 of FIG. 1, but a temporarily fluctuating error will occur in its output due to an oscillatory fore-and-aft shifting of the vehicle caused by the wheels passing over the concave 106. Such a fluctuating error in the longitudinal acceleration signal would cause an instability of the vehicle behavior control. This is also avoided by the present invention.

Figure 5:
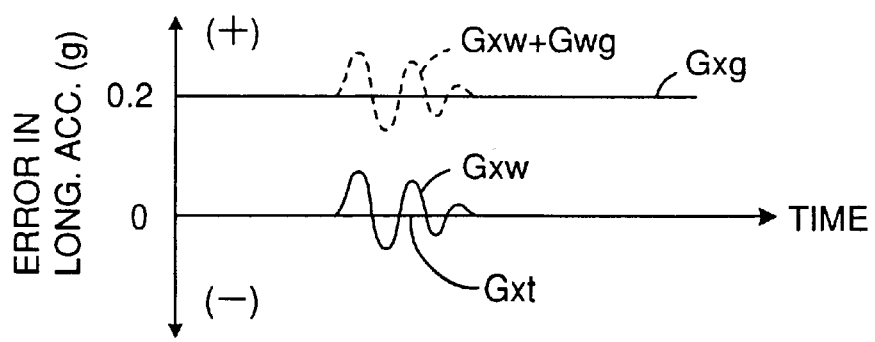
FIG. 5 is a diagram showing examples of the static and dynamic errors caused in the measurement by the conventional longitudinal acceleration sensors under the situations of FIGS. 3 and 4, also showing how the errors are avoided according to the present invention.

FIG. 5 shows exemplarily those two kinds of errors which will occur in the conventional longitudinal acceleration detection devices, and which are still pertinent to the above-mentioned signals of Gxw and Gxg. However, according to the present invention, the signals of Gxw and Gxg are respectively differently processed by the filtering processes of removing high frequency components or low frequency components therefrom, so that the output longitudinal acceleration Gxt is free of both of the above-mentioned errors.

Figure 6A:
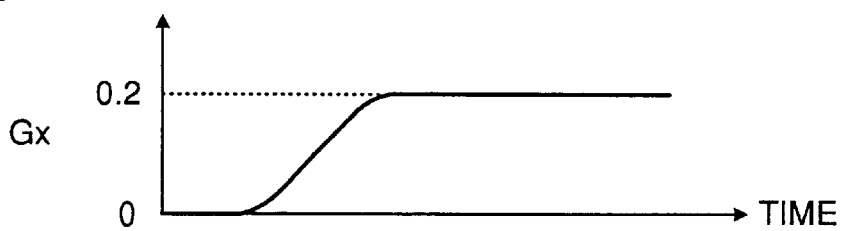
FIGS. 6A–6E are a set of graphs showing an example of detection of accelerations by various acceleration detection means.
Figure 6B:
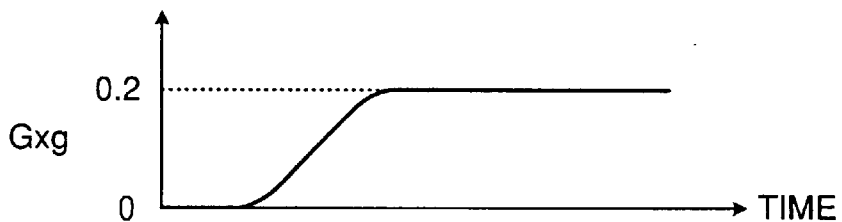
Figure 6C:
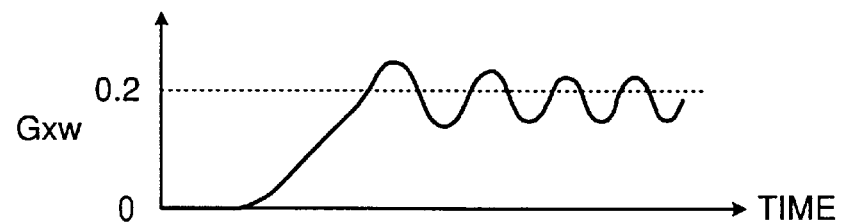
Figure 6D:
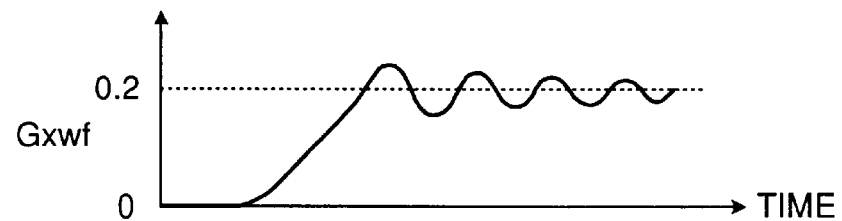
Figure 6E:
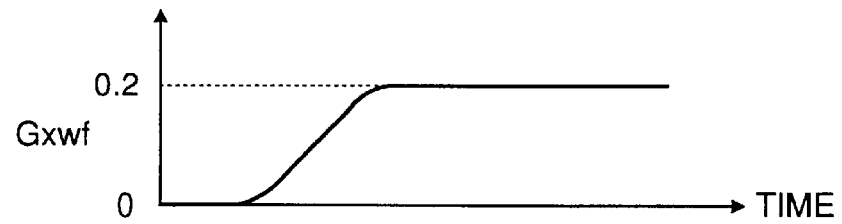

In another example, assuming that a vehicle is braked at a deceleration Gx such as shown in FIG. 6A, the longitudinal acceleration Gxg based upon the longitudinal acceleration sensor 24 will change as shown in FIG. 6B, provided that the vehicle is running on a horizontal road. In this case, if a locking occurs in the brake of one or more wheels, the longitudinal acceleration Gxw based upon the wheel speed sensors 22FL–22RR will oscillate as shown in FIG. 6C. If the acceleration signal Gxw is filtered by the normal cutoff frequency fcn described with reference to step 70 of FIG. 2, the filtered acceleration Gxwf will still show a vibration such as shown in FIG. 6D. However, when the cutoff frequency fc is lowered to fcl as described with reference to step 80 of FIG. 2, then the acceleration signal Gxwf will be rectified as shown in FIG. 6E.

Although the present invention has been described in detail with respect to some preferred embodiment thereof, it will be apparent for those skilled in the art that various modifications are possible with respect to the shown embodiments within the scope of the present invention.

What is claimed is:

1. A device for measuring longitudinal acceleration of a vehicle having wheels, comprising:

first means for detecting wheel speed of at least one of the wheels to generate a first signal indicating the wheel speed;

second means for detecting the longitudinal acceleration of the vehicle to generate a second signal indicating the longitudinal acceleration;

third means for differentiating the first signal by time to generate a third signal indicating change rate of the wheel speed;

fourth means for filtering the second signal to remove low frequency components thereof therefrom to generate a fourth signal;

fifth means for filtering the third signal to remove high frequency components thereof therefrom to generate a fifth signal; and sixth means for combining the fourth and fifth signals together to generate a sixth signal indicating a final value for the longitudinal acceleration of the vehicle.

2. A device according to claim 1, wherein the sixth means generates the sixth signal by averaging the magnitudes of the fourth and fifth signals.

3. A device according to claim 1, wherein the vehicle has a brake system for selectively applying a braking force to at least one of the wheels, the device further comprising seventh means for detecting a locking condition of at least one of the wheels due to the braking force applied by the brake system, the fifth means lowering a threshold frequency for the filtration above which the fifth means removes the high frequency components from the third signal to generate the fifth signal when the seventh means detects the locking condition of the wheel.

4. A device according to claim 3, wherein the seventh means detects the locking condition of the at least one wheel by a slip ratio thereof being larger than a threshold value predetermined therefor.

5. A device for measuring a longitudinal acceleration of a vehicle having wheels, the device comprising:

a first sensor that detects a wheel speed of at least one of the wheels to generate a first signal indicating the wheel speed;

a second sensor that detects the longitudinal acceleration of the vehicle to generate a second signal indicating the longitudinal acceleration;

a controller comprising:
a first calculator that differentiates the first signal by time to generate a third signal indicating a change rate of the wheel speed;
a high pass filter that filters the second signal to remove low frequency components thereof therefrom to generate a fourth signal;

a low pass filter that filters the third signal to remove high frequency components thereof therefrom to generate a fifth signal; and a second calculator that combines the fourth and fifth signals together to generate a sixth signal indicating a final value for the longitudinal acceleration of the vehicle.

6. A device according to claim 5, wherein the sixth signal is generated by averaging the magnitudes of the fourth and fifth signals.

7. A device according to claim 5, wherein the vehicle further comprises:

a brake system that selectively applies a braking force to at least one of the wheels, and a detector that detects a locking condition of at least one of the wheels, in response to the braking force being applied by the brake system, a threshold frequency of the low pass filter being lowered for the filtration above which the low pass filter removes the high frequency components from the third signal to generate the fifth signal when the detector detects the locking condition of the wheel.

8. A device according to claim 7, wherein the controller detects a locking condition of at least one wheel where a slip ratio is determined to be larger than a predetermined threshold value.

* * * * *